US005586517A

United States Patent [19]
Willis et al.

[11] Patent Number: 5,586,517
[45] Date of Patent: Dec. 24, 1996

[54] FLAG SUPPORT AND ANGULATION SYSTEM

[76] Inventors: Tucker Willis, 4717 Wildwood Rd., Dallas, Tex. 75209; James Cinquemani, Jr., 2412 Hardwick, Dallas, Tex. 75208

[21] Appl. No.: 276,068

[22] Filed: Jul. 15, 1994

Related U.S. Application Data

[63] Continuation-in-part of Ser. No. 42,155, Apr. 2, 1993, Pat. No. 5,335,621.

[51] Int. Cl.[6] .......... G09F 17/00; A01K 97/10

[52] U.S. Cl. .......... 116/173; 248/535; 248/538

[58] Field of Search .......... 248/207, 514, 248/520, 532, 535, 538; 116/173, 174

[56] References Cited

U.S. PATENT DOCUMENTS

| | | | |
|---|---|---|---|
| 1,119,147 | 12/1914 | Fillmore | 116/174 |
| 1,273,098 | 7/1918 | Schumann | 116/173 |
| 1,311,712 | 7/1919 | Power | 116/174 |
| 1,338,210 | 4/1920 | Buckley | 116/173 |
| 2,646,240 | 7/1953 | Anderson | 248/207 |
| 2,794,414 | 6/1957 | Reifschneider | 116/173 |
| 4,593,877 | 6/1986 | van der Wyk | 248/512 |
| 5,156,110 | 10/1992 | Fuller | 116/173 |
| 5,495,821 | 3/1996 | Brewer | 116/174 |

FOREIGN PATENT DOCUMENTS

| | | | |
|---|---|---|---|
| 0145273 | 5/1954 | Denmark | 116/173 |
| 0838460 | 3/1939 | France | 116/173 |
| 0296292 | 7/1915 | Germany | 116/174 |
| 0182916 | 3/1936 | Switzerland | 116/173 |

OTHER PUBLICATIONS

Eder Flag Mfg. Co., Inc., Oak Creek, Wisconsin Catalog, 1991, pp. 18–19, 56, 61–62, 68, 73, 75.

Flagpole Components, Inc., Addison Texas, Catalog #2, 1992, pp. 2, 8, 13.

Dettra Flag Company (D.F.C.) Catalog, 1991, pp. 5–7, 43, 45, 49, 64.

EMC A Div. of Eder Mfg. Corp. Custom Flags & Banners/ Flagpoles & Accessories, 1991, pp. 60–61.

Concord Industries, Inc., Addison, Texas, Flagpoles Catalog, 1992, pp. 10–11.

*Primary Examiner*—William A. Cuchlinski, Jr.
*Assistant Examiner*—Willie Morris Worth
*Attorney, Agent, or Firm*—Jenkens & Gilchrist, a Professional Corporation

[57] ABSTRACT

A flag staff assembly comprising an elongated flag staff adapted for the support of a flag thereon and a re-angulating staff assembly permitting selective positioning of the flag staff. The base member, finial and staff are formed with similar aesthetic portions to provide an ornamental assembly capable of displaying flags and pennants in a variety of positions.

20 Claims, 2 Drawing Sheets

FLAG SUPPORT AND ANGULATION SYSTEM

The present application is Continuation-in-Part of U.S. application Ser. No. 08/042,155 filed Apr. 2, 1993 now U.S. Pat. No. 5,335,621.

BACKGROUND OF THE INVENTION

1. Field of the Invention

The present invention relates to flag support systems and, more particularly, to an angulated flag staff system for securely positioning the flag staff at a variety of select angles.

2. History of the Prior Art

Banners and flags have been displayed from buildings and poles for centuries in one form or another. The contemporary form of a flag display incorporates a generally rectangular cloth member having the appropriate indicia formed thereon and suspended from a vertically disposed flag pole or an angulated staff. The flag staff generally extends outwardly from a vertical surface, such as a building wall or vertical column, whereas flag poles are mounted in the ground. Typically, vertical flag poles are rather large in construction and are used for large residential structures, as well as a myriad of commercial areas. The staff for use in presenting a flag in an angulated configuration relative to a vertical surface is generally of a shorter length and adapted for support of a flag therefrom.

A variety of systems have been developed for positioning and securing flags to vertical, horizontal, and angulated flag suspension arrangements. In the main, the systems include a means for maintaining a degree of tautness at the bottom of the flag nearest the support member. In upstanding flag poles, the securing system may include retainer loops appropriately securing the top and bottom of the heading of the flag about the flag pole and/or weight members that may depend from the generally horizontally disposed flag. The weight members provide a means for maintaining a degree of tension in the flag in a manner that allows some degree of movement. Such retainer loops are currently in use by commercial enterprises, such as banks, for vertical flag poles.

Staffs used for angulated display of flags are not as well equipped with regard to means for maintaining the tautness at the bottom of the flag. In certain instances, ropes have been used to secure the flag about the flag staff but various disadvantages are associated therewith. Not the least of these disadvantages is the aesthetic appearance of such a rope around the flag staff. However, in most cases on a staff the flag is secured by a halyard with snaps for the top and bottom attachment holes. This also has disadvantages. The use of other tensioning devices has apparently not been accepted in prior art flag assemblies. Another problem is orienting the flag staff and flag in the most aesthetically pleasing position which may be, in some instances, nearly horizontal with the ground. In those instances, tensioning of the flag is not the major problem, but rather the mounting of the flag staff. With a straight flag staff extending from a generally horizontal mounting hole, the staff can be easily dislodged relative to the staff disposed at a steep angle. It would be an advantage to incorporate a system utilizing the distinct advantages of the prior art flag support systems with the multitude of additional advantages in accordance with the principles of the present invention.

The present invention overcomes the problems of the prior art by providing a flag staff support system utilizing a base member which receives a re-angulating shaft. This mounting permits the secured mounting of the flag staff at a steep angle in the base member, but which the flag staff itself assuming a position of much less angularity. The re-angulated position may vary and could be generally horizontal to the ground, in some instances.

SUMMARY OF THE INVENTION

The present invention relates to an angulated flag staff assembly. More particularly, one aspect of the invention includes a flag staff assembly comprising an elongate staff adapted for the support of a flag thereon. A first means for mounting the staff in a first angulated position is provided with second means for re-angulating the staff in a second angulated position. Additional re-angulating means may also be provided for select or varied, angulation settings. The exact angle will vary depending on the selection of the re-angulating means. In this manner the flag staff is secured in the mounting means at a sufficient angle for reliably securing the flag staff thereto while any of a variety of mounting angles of the staff may be provided outwardly therefrom.

In another aspect, the first mounting means comprises a decorative assembly comprising an ornamental base member adapted for securing the staff at a sufficiently steep angle for securement to a generally vertical surface. The second means for re-angulating the staff comprises a solid staff having an angled portion adapted for reducing the angle of the shaft as it would extend from the base member in the first angulated position. The solid shaft may include a neck region adapted for receipt of the staff thereover. In yet another embodiment of the invention, the top end of the flag staff receives an ornamental member such as a finial having aesthetic similarities to the base member. A set screw may also be used to secure the flag staff and/or re-angulating means in the base member.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
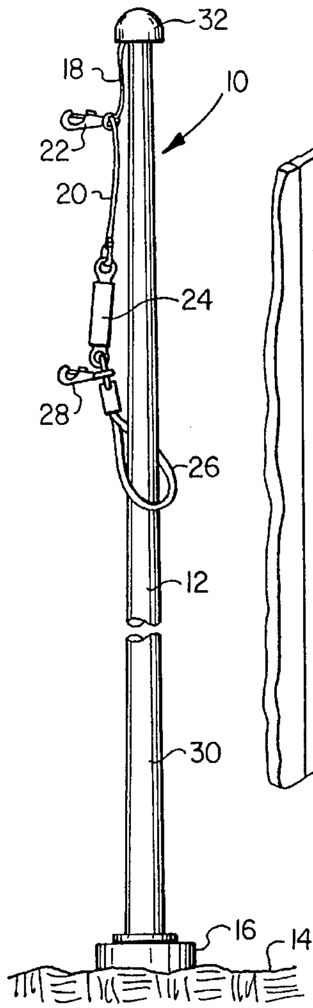
FIG. 1 (PRIOR ART)
FIG. 1 is a side-elevational view of a prior art flag pole assembly illustrating various aspects thereof.

Referring first to FIG. 1, there is shown a prior art flag pole assembly 10 incorporating an upstanding flag pole 12 secured into the ground 14 by a base 16. The flag pole assembly 10 further includes a flag support structure in the form of an internal halyard 18. A lanyard 20 and a snap 22 are disposed on the distal end of the halyard 18, and a weight 24 is disposed on the distal end of the lanyard 20. Further, a retaining loop 26 and a snap 28 are disposed on the distal end of the weight 24. Also, a decorative cap 32 is disposed on the upper end of the flag pole 12 and covers the access to the halyard 18. A flag (not shown) is secured to the snaps 22, 28 and is supported from the flag pole 12 in display of the indicia thereon.

Conventional flag poles, such as the flag pole assembly 10, have numerous features that permit ease in the assembly to, and presentation of, the flag thereon. Both the size and the shape of the flag pole have improved over the years and today include various attractive design features and enhanced finishes. One of the more significant aspects of the flag pole is the internal halyard 18 and the suspension of the flag therefrom. The internal halyard 18 is generally utilized with conventional flag poles and permit ease in the support of the flag from the pole. Further, the internal halyard 18 substantially reduces the availability of the halyard system for vandalism. The internal halyard 18 is of course more aesthetically appealing than an external halyard.

Flag poles are conventionally utilized to display flags and/or decorative members therefrom. In that regard, the flag pole 12 generally incorporates an attractive finish upon an outer surface 30 and a corresponding decorative cap 32 disposed on the upper end of the flag pole. In the prior art illustration of FIG. 1, the weight 24 is attached to the lanyard 20 and then to the halyard 18 and generates tension upon the halyard 18 to allow a flag to be lowered under its own weight when utilizing the internal halyard 18. The weight 24 also imparts a tension from the bottom end to the top end of a flag to maintain a tautness theredown. By utilizing a counterweight, the retaining loop 26 may be utilized therebeneath for securing the lower portion of the weight 24 to the flag pole 12. In earlier versions of flag pole assemblies, an external halyard was utilized and the lower snap 28 was generally secured to a portion of the halyard, and the halyard was usually tightened from near the base 16 of the flag pole 12 by wrapping such around a cleat. These are all conventional elements of flag pole systems and are described and/or illustrated herein for purposes of reference.

Figure 2:
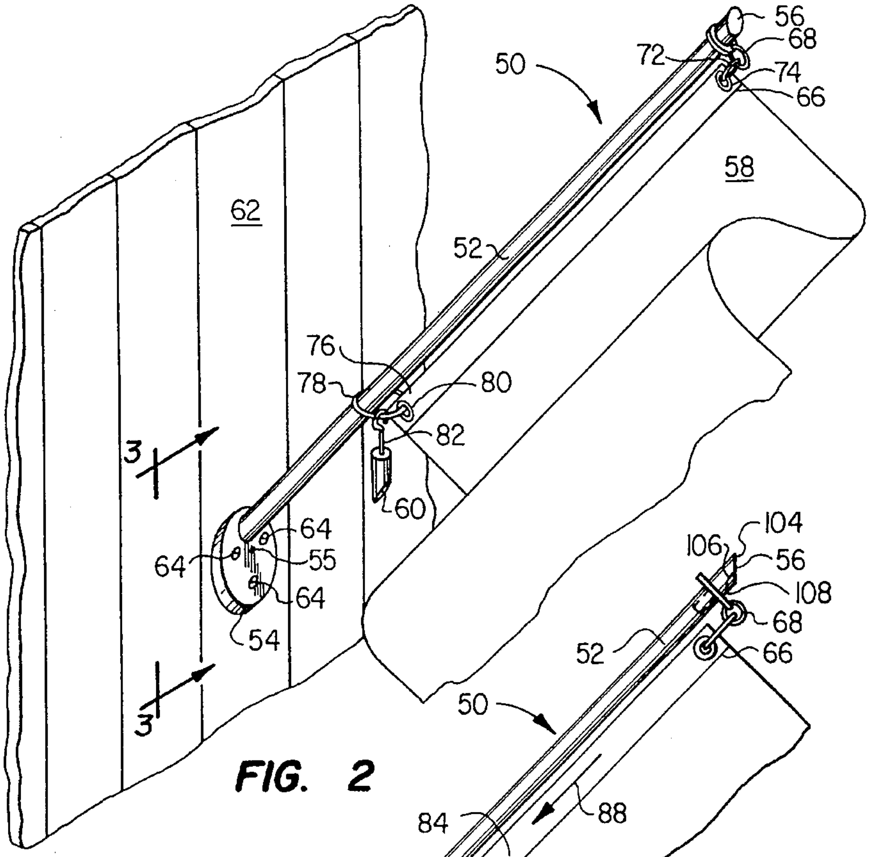
FIG. 2 is a perspective view of one embodiment of a flag staff assembly constructed in accordance with certain ones of the principles of the present invention and illustrating a flag in association therewith.

Referring now to FIG. 2, there is shown a flag staff assembly 50 constructed in accordance with certain ones of the principles of the present invention. The flag staff assembly 50 incorporates an elongate staff 52, a base or mounting member 54 an end piece or finial 56, and a weight 60. The finial 56 is an ornament added to the flag staff for decoration and as a means for supporting the top end of the flag. A flag 58 is shown secured to the staff 52 with the weight 60 depending therefrom. In the configuration shown herein, both functional and aesthetic advantages are provided.

Still referring to FIG. 2, the flag staff assembly 50 is positioned against, and secured to, a vertical wall 62. The base 54 is secured to the vertical wall 62 by plurality of fastening elements or screws 64 extending therethrough. Likewise the staff 52 is secured within the base 54 by a set screw 55. This is but one embodiment of a securement option and the fastening element of the base 54 may also be assembled from behind in an alternative embodiment. A top end 66 of the flag 58 is secured to the staff 52 by a mounting ring 68. The mounting ring 68 is attached to the finial in various methods, such as that shown herein. A fastening member 72 connects the mounting ring 68 to an eye 74 formed in the top end 66 of the flag 58. The bottom end 76 of the flag 58 is secured to the staff 52 by a fastening ring 78 that extends through an eye 80 disposed in the bottom end of the flag 58, and around the staff 52 with the weight 60 depending therefrom. The weight 60 is connected to the fastening ring 78 by a connector 82. The connector 82 is shown assembled to the fastening ring 78 for purposes of illustration. It should be noted that the connector 82 could easily be received directly within the eye 80 to apply the necessary tension to the flag 58, as will be described below.

Figure 3:
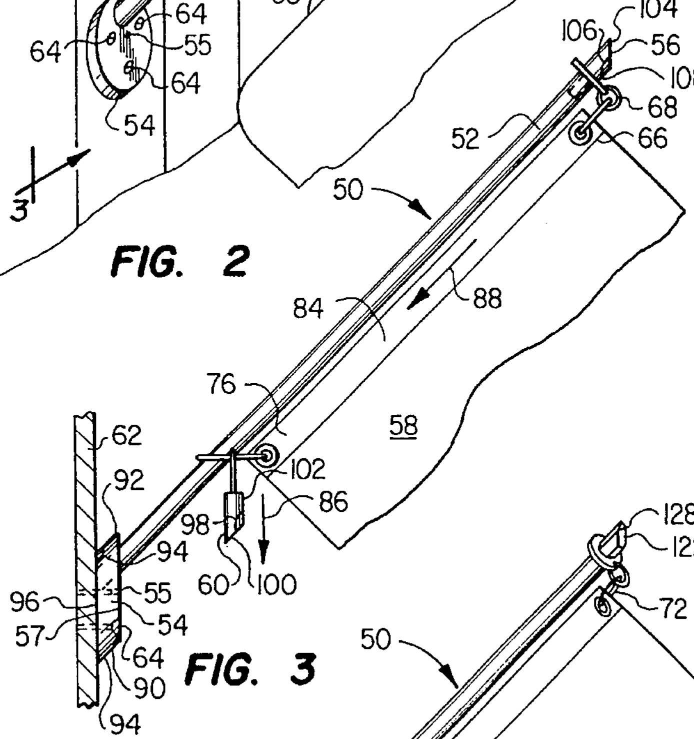
FIG. 3 is a side-elevational view of the flag staff assembly of FIG. 2.

Referring now to FIG. 3, there is shown a side-elevational, cross sectional view of the flag staff assembly 50 taken along lines 3—3 thereof. The flag staff assembly 50 is shown to be mounted to the vertical wall 62 by the fastening elements 64 as described above. The set screw 55 is also shown by dotted lines. The base 54 is also shown with dotted lines illustrating a plurality of countersunk apertures 57 adapted for receiving, and engagement with, the fastening elements 64 therein. Of course, in another embodiment the fastening assembly could be disposed behind the face of the base. More particularly, FIG. 3 illustrates that tension is maintained on bottom end of a heading 84 of the flag 58 by the weight 60 depending therefrom and applying a downward force in the direction of an arrow 86. The top end 66 of the heading 84 of the flag 58 is secured by the mounting ring 68 connected to the finial 56 as described above. A force indicated by arrow 88 is provided by the pull of gravity upon the weight 60. Unlike prior art flag staff arrangements, the flag 58 is therein assembled to the staff 52 while maintaining a taut heading 84 thereacross. The weight 60 acts upon the bottom end 76 of the flag 58 in an angulated relationship. Unlike the weight 24 of FIG. 1, the weight 60 is not part of a halyard system for mounting the flag 58 and is provided solely for the purpose of maintaining tautness across the heading 84, as well as the aesthetic appearance thereof.

Referring still to FIG. 3, it may be seen that the weight 60, base 54 and finial 56 are all constructed with a common aesthetically pleasing design element. These parts could be machined, cast, coined, rolled or otherwise formed with similar aesthetic features. The parts may also be formed from brass, copper, bronze, steel, iron, aluminum, fiberglass, polymers and the like. In the present embodiment, the base 54 comprises a member having angulated side walls 90 and 92 disposed in generally parallel spaced relationship and at an angle 94 relative to a backwall 96 that is substantially identical to an angle 98 defined between a surface 100 and a cylindrical side wall 102 of the weight 60 adjacent thereto. Likewise, the finial 56 has a surface 104 that forms an angle 106 with a cylindrical side wall 108 that is also substantially identical or similar to the angles 94 and 98. In a preferred embodiment, the finial, base and weight 56, 54 and 60, respectively, are of a similar design, are made of similar material, such as brass, with a similar finish, to therein provide an aesthetically pleasing appearance to the flag staff assembly 50 and in the configuration affording functional utility of maintaining the tautness along the heading 84 of the flag 58.

Figure 4:
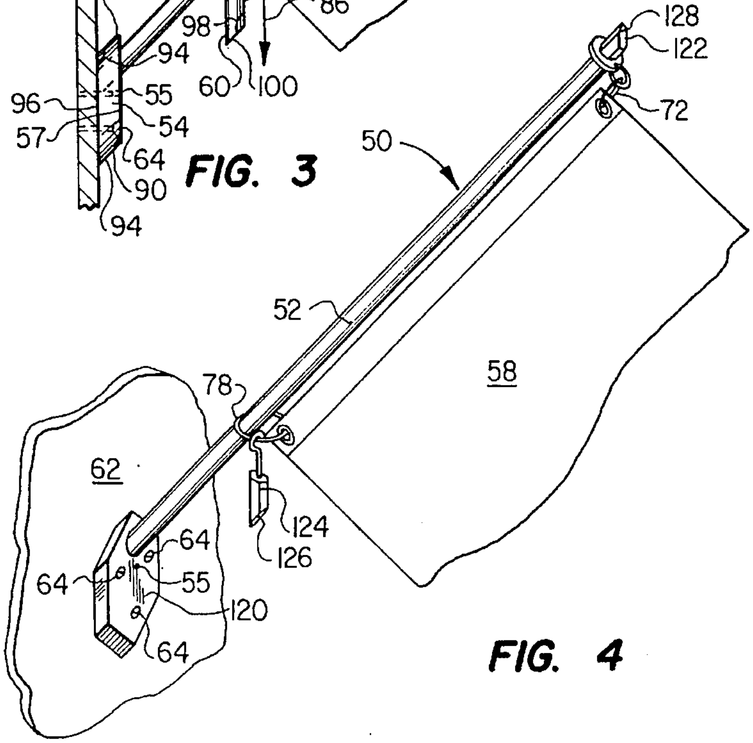
FIG. 4 is a perspective view of an alternative embodiment of the assembly of FIG. 2.

Referring now to FIG. 4, there is shown an alternative embodiment of the flag staff assembly 50 wherein a base 120 is utilized in conjunction with a finial 122 and a weight 124 each having common, or similar, aesthetic aspects thereof. The staff 52 is of course identical to that shown in FIG. 3 and the other attachment elements, such as the fastening member 72 and the fastening ring 78, are identical. What is not identical is the shape of the base 120, the shape of the weight 124 and the shape of the finial 122. In this particular embodiment, each of these elements incorporates a six-sided prismatic solid having an angulated side portion similar to the angulated side wall 90 of the base 54 discussed relative to FIG. 3. However, the weight 124 and the finial 122 are also constructed with six sides and an angulated bottom surface 126 to an angulated top surface 128 corresponding in the matter described relative to the surfaces 100 and 104, respectively, of FIG. 3. The base 120 is shown secured to the vertical wall 62 by the fastening elements 64.

Figure 5:
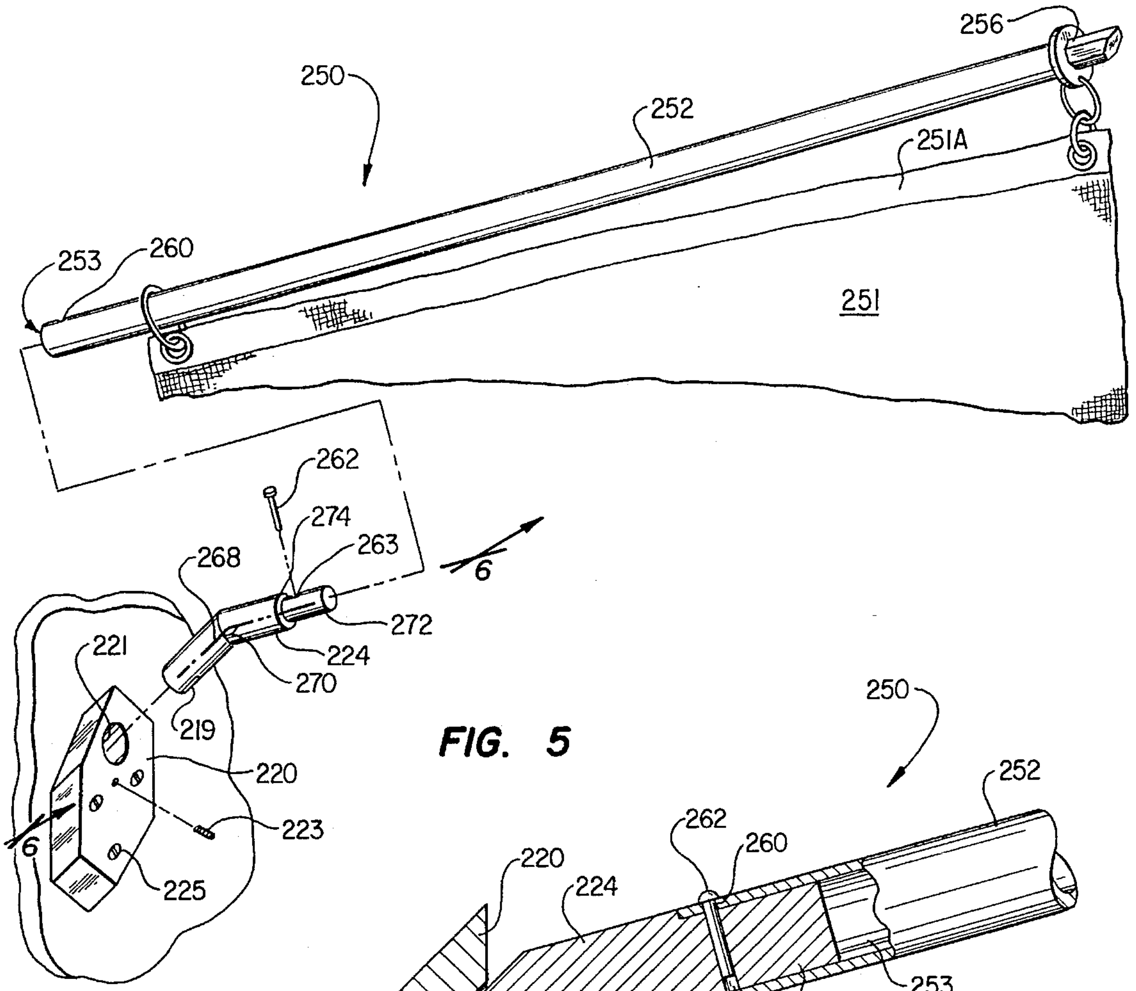
FIG. 5 is an exploded perspective view of one embodiment of an angulated flag staff assembly constructed in accordance with the principles of the present invention.

Referring now to FIG. 5 there is shown an exploded perspective view of one embodiment of an angulated flag staff assembly 250 constructed in accordance with the principles of the present invention. The assembly 250 incorporates a re-angulating shaft 224 that may be received within an aperture 221 of the base 220 in place of the end of the flag staff itself. In that regard, the flag staff 252 is constructed either of a hollow construction and/or having a hollow region 253 formed in the lower end or a lower end fitting thereof. A lower end fitting (not shown) would be used if a solid wood staff was incorporated. Hollow region 253 is adapted for matingly receiving a neck portion 272 of shaft 224. Neck portion 272 is constructed with an aperture 263 formed therein adapted for receiving a pin 262 therein. The aperture 263 is formed adjacent to shoulder 274 adapted for abutting engagement with the end of hollow staff 252. In this particular configuration, as shown most clearly in FIG. 6, the flag staff 252 may be re-angulated relative to the base 220 into a position substantially more horizontal, or in some cases more vertical, than that position which would be assumed if the flag staff 252 were inserted directly into the aperture 221 of the base 220. In this manner, a flag staff 252 may be positioned to a select angle between 90° and 175° relative to vertical. The select angle is chosen to be more aesthetically pleasing and/or practical for certain banners, festival flags, pennants and the like. With such a configuration, however, the weight described above would no longer be necessary. The term "generally horizontal" as used herein includes angles of up to around 15° relative to the horizontal.

Referring still to FIG. 5, a finial 256 is shown at the end of staff 252 opposite the aperture 260 formed in the opposite end thereof and adapted for receiving the pin 262 therethrough. A flag 251 is shown attached to staff 252. A center line 268 is shown in and along the re-angulating shaft 224 for illustrating the angle 270 formed therein whereby flag 251 will hang down in a more vertical direction. It is the angle 270 which is the re-angulating angle for disposing a shaft 252 in the generally horizontal configuration addressed above. Consistent with the description above, threaded fasteners 225 are utilized for securing the base 220 to vertical surface 226. A set screw 223 is provided and adapted for extending through base 220 into a groove 219 formed in the shaft 224. The set screw 223 prevents the shaft 224 from rotating and changing the angle which the flag staff 252 assumes relative to the horizontal.

Figure 6:
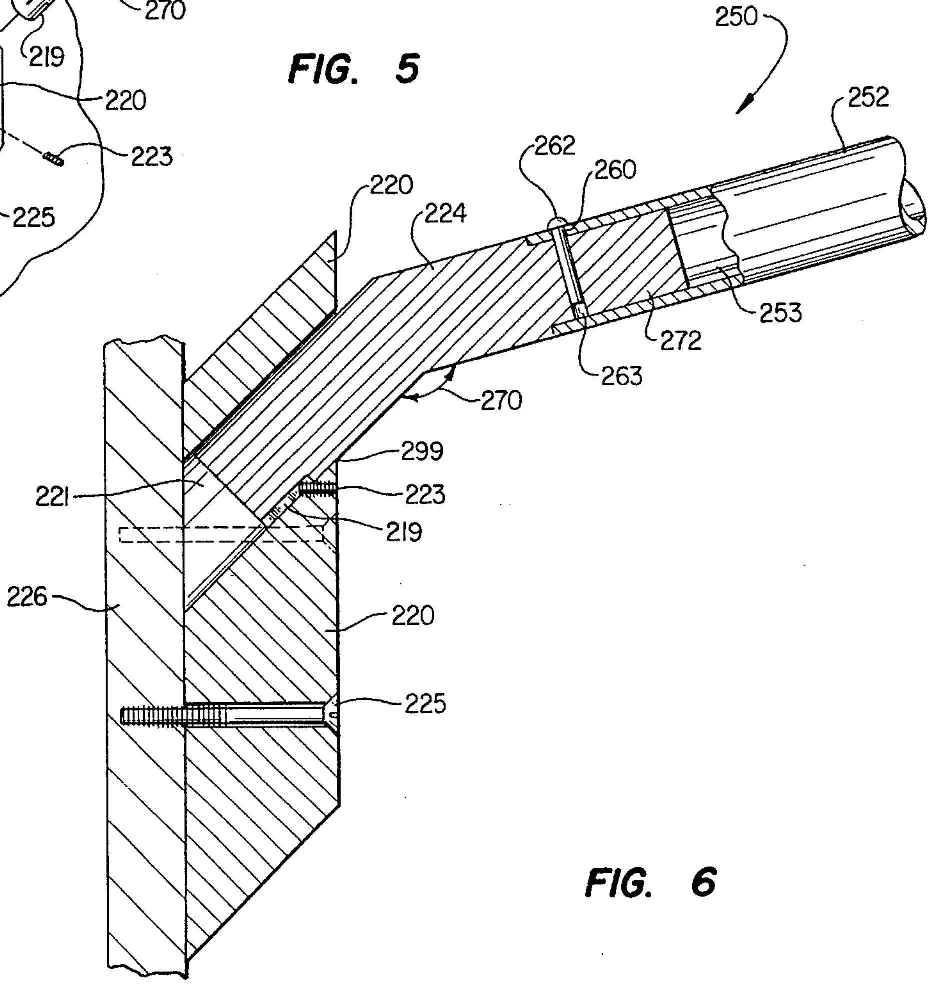
FIG. 6 is an enlarged, side elevational, fragmentary cross sectional view of a portion of the flag staff assembly of FIG. 5 taken along lines 6—6 thereof.

Referring now to FIG. 6 there is shown an enlarged, side elevational, fragmentary cross sectional view of a portion of the flag staff assembly of FIG. 5 taken along lines 6—6 thereof. In this particular view it may be seen that the angle 270 is positioned in this particular configuration to re-angulate the flag staff 252 into a position only slightly inclined from the horizontal. As shown in FIG. 5, a flag hanging from the staff 252 would not need a weight to maintain the tautness thereof. It may be preferable in some applications to form a sleeve (not shown) on the heading 251A, as is conventional in the industry. A sleeve can then slide over the shaft 252 of FIG. 5 to further eliminate any sagging problems of the flag at lower angles. At higher angles of around 30° or greater, relative to horizontal, rings and a weight (FIG. 2) may be preferable.

Still referring to FIG. 6, set screw 223 is shown extending through the base 220 into the groove 219. Threaded fastener 225 is shown extending through the base 220 into a supporting region such as wall 226. The pin 262 is shown extending through aperture 260 of staff 252 and through aperture 263 of neck portion 272 of shaft 224. The angle 270 can of course be varied to provide a different number of angulated varieties in conjunction with the principles of the present invention. Moreover, a series of re-angulating shafts 224 having different angles 270 may be provided for a single flag staff 252 and its positioning at select angles in accordance with the preference of the user.

In accordance with certain ones of the principles of the present invention, the flag staff assembly 250 incorporates the two aesthetically matched elements of the base 220 and the finial 256 to provide, in conjunction with the staff 252 and re-angulating shaft 224 (or set of shafts 224 having different angles 270), an assembly that is capable of supporting the flag 58 in an aesthetically pleasing and functionally correct generally horizontal configuration with advantages not heretofore found in conventional flag staff assemblies. Of course, any size, shape or color of the finial and base could be used. Likewise, any aesthetically pleasing similarity between the finial and base could be utilized in accordance with the principles of the present invention. In addition, at those angles where it is desirable to use the weight to apply downward tension on the heading, the weight would also have a similarity to the base and finial.

As set forth above, the re-angulating shaft 224 of the present invention permits the flag staff 252 to be securely mounted to the base 220. This secured mounting is provided by the relatively steep angle of the aperture 221 formed in the base 220. The steep angle of the aperture 221 is sufficient to secure any flag staff inserted therein by virtue of the weight thereof. The weight of the flag staff tends to bend the flag staff across the top edge 299 of the aperture 221, as shown in FIG. 6, which pressure thereagainst causes the assembly to be locked in place. If aperture 221 was generally horizontal, lateral forces on the flag or flag staff (such as wind) could result in the flag staff being dislodged from the aperture and falling. Securement means such as clamps could, of course, be utilized but, the present invention provides improved securement means by utilizing the steep angle of the aperture 221 and the base member 220 and the installation of the angulated shaft 224 which thereby provides for the flag staff 252 to extend outwardly therefrom in any of a variety of angles relative thereto. As stated above, the re-angulating shaft 224 may be provided in a variety of angles for different applications. The angle 270 of the shaft 224 may vary to the point of providing the flag 251 (as shown in FIG. 5) in a totally horizontal configuration and/or in a variety of other angles.

In certain embodiments of the present invention, a plurality of angulated shafts 224 having different angles 270 may be provided with a single base 220 for allowing flexibility in the use thereof in the hanging of flags of different varieties therefrom. Likewise a variety of materials may be utilized in the fabrication of the base member, the re-angulating shaft 224 and/or flag staff 252. These materials include brass, bronze, other copper alloys, aluminum, iron, fiberglass, polymers, and the like. Any single one and/or all of the elements described herein may be formed from these materials and/or a common material. In a preferred embodiment the invention, the finial 256 and the base 220 are both formed with common aesthetic parts such as the angled sidewalls thereof and of a common material, such as brass. And, where it is desirable to use the weight, it also will have common aesthetic parts with the base and finial.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

We claim:

1. An improved flag staff assembly of the type wherein an elongate flag staff, having at least a hollow region formed in one end thereof, is disposed at an angle relative to a generally vertical surface having means for supporting a flag therefrom above a ground region wherein the improvement comprises:

a base member adapted for securement to said vertical surface in support of said flag staff therefrom, said base member being formed with an aperture therein adapted for receipt of said flag staff in a first angulated position therein; and means for re-angulating said flag staff to another angulated position, said means for re-angulating including an angulated shaft having first and second ends and adapted for receipt of said first end into said aperture, said second end including a neck portion for receiving said hollow region, formed in one end of said flag staff, over said neck portion, wherein said first end of said angulated shaft includes a slotted portion therein, said slotted portion being adapted for receiving an elongate member extending through said base member for preventing rotation of said angulated shaft in said base member.

2. The apparatus as set forth in claim 1 wherein said angulated shaft is formed at an angle between said first and second ends adapted for reorienting said flag staff.

3. The apparatus as set forth in claim 2 and further including a locking pin adapted for securing said flag staff to said second end of sad angulated shaft and wherein said flag staff and said angulated shaft are each formed with an aperture therein adapted for alignment one with the other during the assembly thereof for receipt of said pin therethrough.

4. The apparatus as set forth in claim 1 and further including a finial adapted for securement to the top end of said flag staff.

5. The apparatus as set forth in claim 4 wherein said finial is formed with aesthetic portions and said base member is constructed with aesthetic sidewalls generally matching said aesthetic portions of said finial.

6. The apparatus as set forth in claim 5 wherein at least one of said base member, finial and angulated shaft are formed of copper alloys.

7. The apparatus as set forth in claim 6 wherein at least one of said base member, finial and angulated shaft are formed of iron.

8. The apparatus as set forth in claim 6 wherein at least one of said base member, finial and angulated shaft are formed of aluminum.

9. The apparatus as set forth in claim 6 wherein at least one of said base member, finial and angulated shaft are formed of fiberglass.

10. The apparatus as set forth in claim 6 wherein at least one of said base member, finial and angulated shaft are formed of a polymer.

11. An improved method of suspending a flag from a flag staff, having at least a hollow region formed in one end thereof, supported at an angle relative to a generally vertical surface comprising the steps of:

providing a base member for securement to said vertical surface in support of said flag staff therefrom;

forming an aperture in said base member for receiving said flag staff therein for support of said flag in a first angulated position outwardly therefrom;

providing means for re-angulating said flag staff in another angulated position relative to said aperture in said base member, said means for re-angulating said flag staff including an angulated shaft having first and second ends and adapted for receipt of said first end into said aperture, said second end including a neck portion for receiving said hollow region formed in one end of said flag staff, over said neck portion;

forming said angulated shaft with a slotted portion therein, said slotted portion being adapted for receiving a threaded fastener extending through said base member for preventing rotation of said angulated shaft in said base member;

inserting said re-angulating means into said aperture in said base member; and securing said hollow region formed in one end of said flag staff over said neck portion of said re-angulated means for positioning said flag staff in said another angulated position.

12. The method as set forth in claim 11 and further including the step of forming said re-angulating means as a shaft halving an angle formed therein for reorienting said flag staff secured thereto.

13. The method as set forth in claim 12 and further including the step of providing a locking pin adapted for securing said flag staff to said angulated shaft and the step of forming said flag staff and said angulated shaft each with an aperture therein adapted for aligning one with the other during the assembly thereof for receipt of said pin therethrough.

14. The method as set forth in claim 12 and further including the step of providing a finial and securing said finial to the top end of said flag staff.

15. The method as set forth in claim 14 and further including the step of forming said finial and base members with aesthetic portions generally matching each other.

16. The method as set forth in claim 14 and further including the step of forming at least one of said base member, finial and angulated shaft of copper alloys.

17. The method as set forth in claim 14 and further including the step of forming at least one of said base member, finial and angulated shaft of iron.

18. The method as set forth in claim 14 and further including the step of forming least one of said base member, finial and angulated shaft of aluminum.

19. The method as set forth in claim 14 and further including the step of forming at least one of said base member, finial and angulated shaft of fiberglass.

20. The method as set forth in claim 14 and further including the step of forming at least one of said base member, finial and angulated shaft of a polymer.

* * * * *

UNITED STATES PATENT AND TRADEMARK OFFICE

CERTIFICATE OF CORRECTION

PATENT NO. : 5,586,517

DATED : Dec. 24, 1996

INVENTOR(S) : Willis et al.

It is certified that error appears in the above-indentified patent and that said Letters Patent is hereby corrected as shown below:

| | |
|---|---|
| **Column 7, line 27** | After "portion"<br>Insert --formed-- |
| **Column 7, line 37** | Replace "sad"<br>With --said-- |
| **Column 8, line 32** | Replace "halving"<br>With --having-- |

Signed and Sealed this

Twelfth Day of August, 1997

*Attest:*

Bruce Lehman

BRUCE LEHMAN

*Attesting Officer*

*Commissioner of Patents and Trademarks*